United States Patent [19]

Evans

[11] Patent Number: 5,030,957
[45] Date of Patent: Jul. 9, 1991

[54] METHOD OF SIMULTANEOUSLY MEASURING ORTHOMETRIC AND GEOMETRIC HEIGHTS

[75] Inventor: Alan G. Evans, LaPlata, Md.

[73] Assignee: The United States of America as represented by the Secretary of the Navy, Washington, D.C.

[21] Appl. No.: 661,352

[22] Filed: Feb. 26, 1991

[51] Int. Cl.$^5$ ............................................. G01S 5/14
[52] U.S. Cl. .................................. 342/357; 342/450
[58] Field of Search ............... 342/357, 352, 450, 451, 342/453, 457; 364/439

[56] References Cited

U.S. PATENT DOCUMENTS

| | | | |
|---|---|---|---|
| 4,170,776 | 10/1979 | MacDoran | 342/352 |
| 4,860,018 | 8/1989 | Counselman III | 342/357 |
| 4,870,422 | 9/1989 | Counselman III | 342/357 |
| 4,965,586 | 10/1990 | O'Neill et al. | 342/357 |

Primary Examiner—Mark Hellner
Attorney, Agent, or Firm—John D. Lewis; Kenneth E. Walden

[57] ABSTRACT

A method of simultaneously measuring orthometric and geometric heights is provided. Simultaneous Global Positioning System (GPS) and level surveying is proposed to more efficiently obtain certain geodetic measurements. GPS receiver antennas are attached to the top of leveling rods and GPS measurements are taken while a level survey is performed. This procedure enables precise estimates in differences between the change in orthometric height and change in geometric height to be determined along baselines.

18 Claims, 2 Drawing Sheets

METHOD OF SIMULTANEOUSLY MEASURING ORTHOMETRIC AND GEOMETRIC HEIGHTS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the measurement of geodetic quantities and more particularly to a method of simultaneously measuring orthometric and geometric heights.

BACKGROUND OF THE INVENTION

Knowledge of the vertical deflection of the gravity vector has great utility in various inertial navigation and/or geodetic applications. Conventional procedures to determine the two-dimensional deflection of the gravity vector require the use of a theodolite for stellar observations and clear night-time weather conditions. Therefore, this procedure is sensitive to environmental conditions.

More recently, the vertical deflection of the gravity vector has been related to changes in orthometric and geometric heights over a baseline as taught by Heiskamen and Moritz in "Physical Geodesy", W. H. Freeman and Company, San Francisco, 1967. Changes in orthometric heights are normally determined by a standard spirit leveling survey. These heights are referenced, where possible, to mean sea level. The leveling survey determines the change in orthometric height above sea level of the land surface. Change in geometric height is the difference in height above an ellipsoid model of the earth at two locations. This is normally determined using satellite relative positioning procedures.

The drawbacks of this approach include the time required to effect the determination of both the orthometric and geometric height measurements since both are determined separately. Furthermore, benchmarks indicating baselines must be used to establish the points of reference for each separate measurement. Thus, the separate determinations of orthometric and geometric height differences are inevitable sources of error. Also, satellite surveying benchmarks are often blocked from receiving the RF satellite signals. For these benchmarks, nearby offset locations must be chosen which can receive the RF satellite signals. It thus becomes necessary to relate the offset locations to the original benchmark of interest.

SUMMARY OF THE INVENTION

Accordingly, it is an object of the present invention to provide a method of simultaneously measuring relative orthometric and geometric heights for use in determining a two-dimensional vertical deflection of the gravity vector.

It is a further object of the present invention to provide a method of determining the two-dimensional vertical deflection of the gravity vector with a high degree of accuracy in a minimum amount of time.

Still another object of the present invention is to provide a method of effectively utilizing satellite surveying techniques to simultaneously measure relative orthometric and geometric heights even when selected benchmarks are blocked from receiving RF satellite signals.

Other objects and advantages of the present invention will become more obvious hereinafter in the specification and drawings.

In accordance with the present invention, a method of simultaneously measuring orthometric and geometric heights is provided. Global Positioning System (GPS) receiver antennas are attached to the top of standard leveling rods. The leveling rods are placed on the earth's surface whereby any two rods define a reference baseline therebetween. Encoded radio frequency (RF) signals are continuously transmitted from a plurality of GPS earth orbiting satellites. A geometric height differential between the earth's surface and an ellipsoid model of the earth's surface is measured based upon the encoded RF signals received by the GPS receivers. The earth's surface is simultaneously surveyed along the reference baseline according to any one of a variety of standard leveling techniques to determine an orthometric height differential between the earth's surface and a geoid line representative of mean sea level. The simultaneous determination of geometric and orthometric height differentials over the length of the reference baseline may be used to determine a two-dimensional vertical deflection of the gravity vector or obtain precise geoid models.

DETAILED DESCRIPTION OF THE INVENTION

Figure 1:
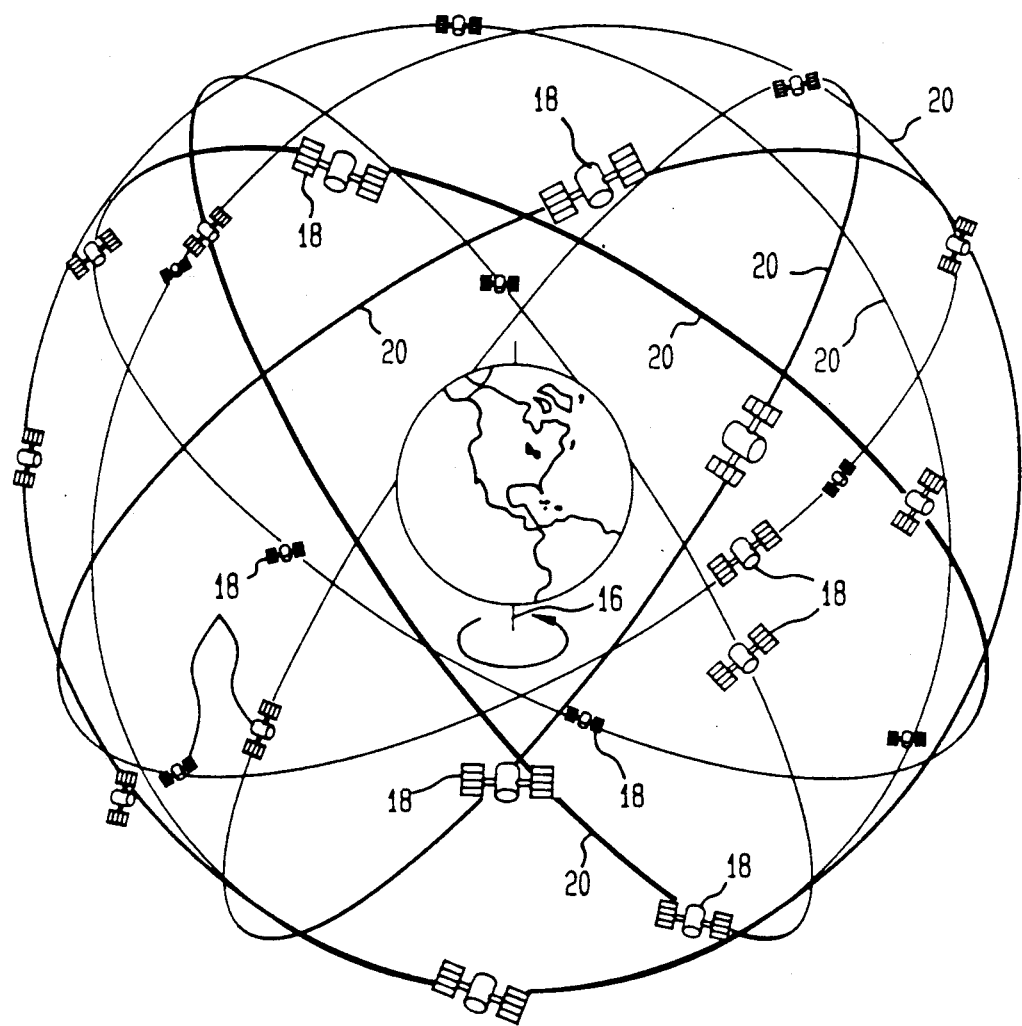
FIG. 1 is a diagrammatic view of the Global Positioning System (GPS) used by the method of the present invention.

The Global Positioning System (GPS) is now well-known in the field of navigation. A brief description of the GPS will however be provided with reference to FIG. 1 where the earth rotates about its north-south axis 16 in the manner shown. The GPS constellation is made up of a plurality of twenty-four (24) satellites 18 placed in six planes equally spaced about the earth. In each plane 20 will be three or four satellites more or less equally spaced in the plane. Each satellite in the plane is arranged to exhibit a nearly-circular orbital path about the earth at an altitude of about 20,000 kilometers. Each plane 20 is disposed in angular and spatial relation to each of the other five planes thereby forming an angle of approximately 60 degrees between adjacent planes. At the same time, each plane 20 is disposed in angular relation to the equatorial plane to form an angle of about 55 degrees therebetween. The time required for a satellite to travel in its planar orbit about the earth is approximately twelve sidereal hours.

The primary electrical power for each satellite 18 is provided by solar cells and rechargeable batteries (not shown). Only during eclipses are the batteries used exclusively. The satellites 18 continuously transmit a pair of encoded pseudorange signals at predetermined L-band frequencies at $L_1$:1575.42 megaHertz (MHz) and $L_2$:1227.60 MHz. One reason for utilizing a pair of signals from each satellite 18 is to compensate for the adverse effects of the ionosphere on the determination of the range. The transmitted signal frequencies are a multiple of the 10.23 MHz primary frequency reference contained in each satellite 18. This frequency reference may be either a Cesium or Rubidium atomic frequency standard. The signals transmitted by the satellites 18 consist of two codes: the coarse code C which repeats every millisecond, and the precise code P which repeats each week. Attached to each of these codes is the navigation message, a 50 bits/second data stream containing the predicted satellite ephemeris and clock corrections and other information. Each GPS satellite is assigned its own unique code by which it is identified; this is called Code Division Multiple Access. The user's receiver(s), located on the earth's surface, can select the satellites to track by selecting the appropriate code numbers and generating the corresponding code sequence.

Figure 2:
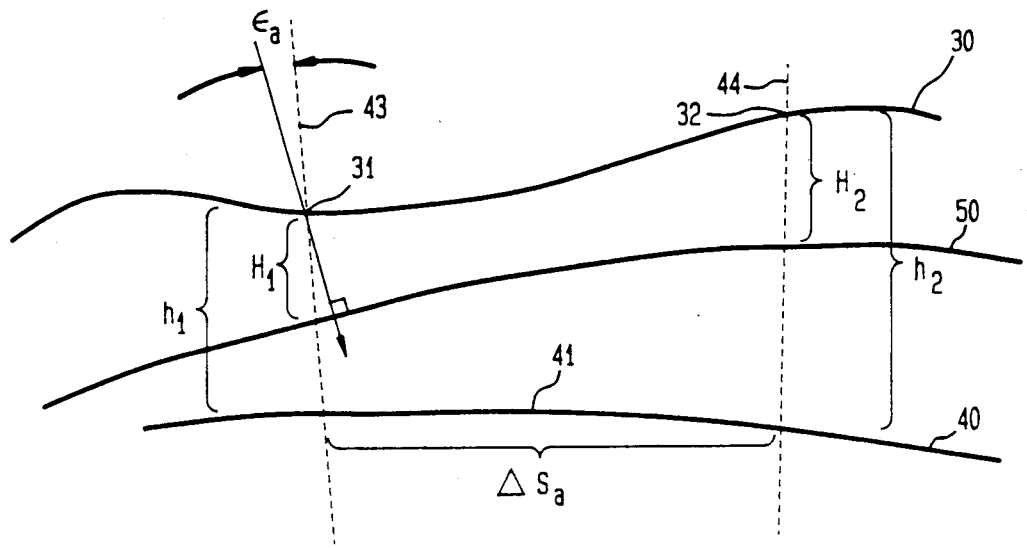
FIG. 2 is a diagrammatic view of the vertical deflection of the gravity vector in relation to the earth's surface, a geoid line and an ellipsoid model of the earth's surface.

Referring now to FIG. 2, the method of simultaneously measuring orthometric and geometric heights will be described. For purposes of description, the method will be described as it relates to the determination of a one-dimensional average vertical deflection of the gravity vector $\epsilon_a$ at a point 31 on the earth's surface 30. The deflection is an average because it is derived over a baseline 41. Baseline 41 is located on a reference surface used to determine geometric heights $h_1$ and $h_2$ between the earth's surface 30 and the reference baseline 41 at points 31 and 32. The geometric height differential ($h_1 - h_2$) will hereinafter be referred to as $\Delta h_a$.

The length of baseline 41 or $\Delta s_a$ is the distance between the intersection of perpendicular lines 43 and 44 with baseline 41. Perpendicular lines 43 and 44 extend from the baseline 41 to the earth's surface 30 at points 31 and 32. For purposes of description, it will be assumed that the reference baseline 41 is located on an ellipsoid model 40 of the earth's surface. The current model utilized by the GPS is the World Geodetic System 1984. Accordingly, perpendicular lines 43 and 44 represent the modeled gravity vector at points 31 and 32, respectively.

Simultaneous to the measurement of the geometric height differential $\Delta h_a$, orthometric heights $H_1$ and $H_2$ between the earth's surface 30 and a geoid line 50 representative of mean sea level are determined. $H_1$ and $H_2$ at points 31 and 32, respectively, are determined by means of a standard leveling survey. The orthometric height differential ($H_1 - H_2$) will hereinafter be referred to as $\Delta H_a$.

The one-dimensional vertical deflection $\epsilon_a$ is defined as the difference between the geometric and orthometric height differentials over the baseline 41. Mathematically, $$\epsilon_a = \frac{\Delta H_a - \Delta h_a}{\Delta S_a} \quad (1)$$

The method of the present invention determines $\epsilon_a$ by simultaneously determining $\Delta h_a$ and $\Delta H_a$. This is made possible by positioning GPS receiver antennas (not shown) at points 31 and 32 to receive the radio frequency (RF) encoded signals continually transmitted by the GPS satellites. The RF encoded signals are then used to measure $h_1$, $h_2$ and $\Delta s_a$ according to methods well-known in the art. Simultaneously, a standard leveling survey is performed between points 31 and 32. The standard leveling survey is accomplished by placing leveling rods (not shown) at points 31 and 32 and by locating a spirit level (not shown) within line-of-sight communication with the leveling rod at points 31 and 32. A third GPS receiver is positioned with the spirit level. To minimize any effects caused by the differential gains between individual GPS receivers, all three GPS receivers face the same direction such as north.

Typically, GPS receivers would be mounted atop each leveling rod and spirit level. In this way, the exact same points 31 and 32 are used in the determination of both the orthometric and geometric height differentials. Furthermore, this enables offset marks to be easily surveyed with respect to an existing mark. For example, if points 31 and 32 are existing marks, it is possible that one (or both) of these points may be blocked from satellite tracking by trees or buildings. In such a case, a nearby offset mark must be chosen to properly position the blocked GPS receiver for data collection. By locating each GPS receiver atop a leveling rod, standard level surveying can be performed between the existing mark and offset mark while the GPS receiver is simultaneously collecting data at the offset mark.

The simultaneous measurement of relative orthometric and geometric heights over a baseline as described above can be used in a variety of ways. The height quantities may be used to obtain a precise geoid model for a prescribed area. In addition, the present method has great utility in determining a two-dimensional vertical deflection of the gravity vector as will be described further hereinbelow.

Figure 3:
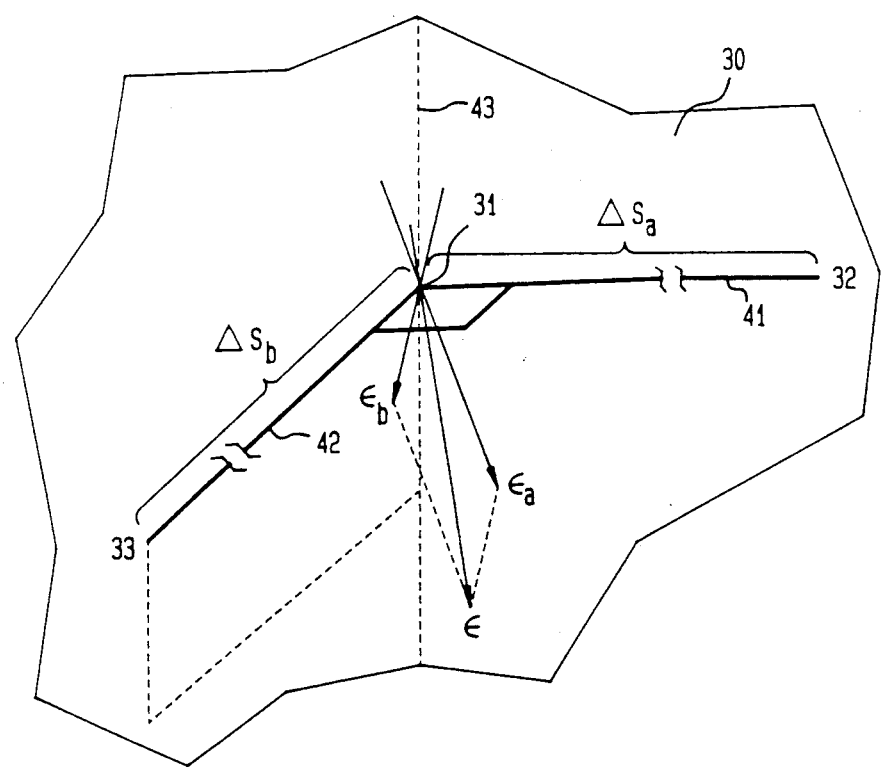
FIG. 3 is a three-dimensional diagrammatic view of the earth's surface showing the relationship of two-orthogonal baselines and the two-dimensional deflection of gravity vector obtained by the method of the present invention.

In order to obtain the two-dimensional vertical deflection $\epsilon$ shown in FIG. 3, it is necessary to repeat the above described process with respect to a second baseline. FIG. 3 is a three-dimensional diagrammatic view of the earth's surface 30 showing the relationship of the two-dimensional vertical deflection $\epsilon$ to modeled gravity vector 43, reference baseline 41 and a second baseline 42. Baseline 42 is selected to be orthogonal to baseline 41 to obtain another one-dimensional vertical deflection $\epsilon_b$. A combination of $\epsilon_a$ and $\epsilon_b$ will yield the two dimensional vertical deflection $\epsilon$. Accordingly, the leveling rod and GPS receiver combination located at point 32 is repositioned to a point 33 on the earth's surface 30. The length of baseline 42 or $\Delta s_b$ is measured along the ellipsoid model of the earth's surface between the modeled gravity vector at points 31 and 33. The simultaneous determination of geometric and orthometric height differentials are then obtained over the length of baseline 42. Although not depicted in the drawings, it is readily apparent that the respective geometric and orthometric height differentials are $\Delta h_b = (h_1 - h_3)$ where $h_3$ is measured at point 33 and $\Delta H_b = (H_1 - H_3)$ where $H_3$ is measured at point 33. Thus, $\epsilon_b$ may be written mathematically as $$\epsilon_b = \frac{\Delta H_b - \Delta h_b}{\Delta S_b} \quad (2)$$

Once again, accuracy is enhanced while the measuring time is decreased by only having to reposition one leveling rod and GPS receiver combination in order to obtain $\epsilon_b$ in a second dimension. The determination of the two-dimensional vertical deflection $\epsilon$ easily follows from the values of $\epsilon_a$ and $\epsilon_b$.

The advantages of the present invention are numerous. By simultaneously collecting geometric and orthometric values at three points on the earth's surface, an accurate and fast determination of the two-dimensional vertical deflection of gravity vector may be obtained. The simultaneous collection is made possible by performing geometric height measurements using GPS receivers and orthometric height measurements using standard leveling techniques. The GPS receivers are positioned at the same points used by the leveling techniques, thereby alleviating the need to benchmark the site for a second set of measurements. Thus, the time to perform the measurements is drastically reduced while simultaneously improving the accuracy of the measurements.

While the present invention has been described relative to a particular embodiment, it is not so limited. For example, the standard leveling survey may be replaced by trigonometric laser leveling techniques. In another embodiment, the two-dimensional vertical deflection may be determined with even greater accuracy by obtaining the geometric and orthometric height differentials over a plurality of baselines, all of which would share a common point of origin. For example, the baselines may be selected to extend radially out from the location at which the vertical deflection is desired, thereby forming a circle around the desired location. Thus, although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

What is claimed is:

1. A method of simultaneously determining relative orthometric and geometric heights comprising the steps of:
    continuously transmitting encoded radio frequency (RF) signals from a plurality of Global Positioning System (GPS) earth-orbiting satellites, such that the transmitted RF signals of each GPS earth-orbiting satellite are a pair of encoded RF signals at predetermined frequencies that are directed in a radial direction towards the earth's surface, all GPS satellites of the plurality of satellites progressively and continuously advancing about the earth in relation to the field of view of a GPS receiver;
    measuring, based upon the encoded RF signals, a first height differential between the earth's surface and a reference surface, said first height differential being measured over the length of a baseline of said reference surface; and
    simultaneously surveying the earth's surface along said reference baseline to determine a second height differential between the earth's surface and a geoid line representative of mean sea level.

2. A method according to claim 1, wherein a difference between said first and second height differentials over the length of said reference baseline is indicative of the average vertical deflection of the gravity vector along said reference baseline, further comprising the steps of:
    selecting a second baseline of said reference surface in an orthogonal direction to said reference baseline; and
    repeating said steps of measuring and simultaneously surveying over the length of said second baseline to determine the average vertical deflection of the gravity vector along said second baseline.

3. A method according to claim 1 wherein said reference surface is an ellipsoid model of the earth's surface.

4. A method according to claim 2 further including the step of measuring the length of said reference and second baselines based upon the encoded RF signals.

5. A method according to claim wherein said step of simultaneously surveying along said reference baseline includes the steps of:
    positioning a first leveling rod and first GPS receiver on the earth's surface at an endpoint of said reference baseline;
    positioning a second leveling rod and a second GPS receiver on the earth's surface at another endpoint of said reference baseline, said second leveling rod in line-of-sight communication with said first leveling rod; and
    positioning a spirit level and a third GPS receiver on the earth's surface wherein said spirit level is in line-of-sight communication with said first and second leveling rods and wherein said first, second and third GPS receivers receive the RF encoded signals.

6. A method according to claim 5 wherein said step of simultaneously surveying along said second baseline further comprises the step of repositioning said second leveling rod and said second GPS receiver on the earth's surface at an endpoint of said second baseline wherein said first leveling rod and said first GPS receiver are located at another endpoint of said second baseline.

7. A method according to claim 5 further comprising the step of facing said first, second and third GPS receivers in the same direction to receive the RF encoded signals.

8. A method according to claim 7 wherein said direction is north.

9. A method according to claim 2 wherein said steps of simultaneously surveying over the lengths of said reference and second baselines is accomplished with laser leveling techniques.

10. A method according to claim 5 further including the step of fixing each of said first, second and third GPS receivers atop of said first and second leveling rods and said spirit level, respectively.

11. A method according to claim 10 wherein at least one of said GPS receivers is blocked from receiving the encoded RF signals at one of said endpoints, further comprising the steps of:
    repositioning said blocked GPS receiver to a nearby location such that said blocked GPS receiver is free to receive the encoded RF signals; and
    simultaneously surveying the earth's surface between said blocked endpoint and said repositioned location.

12. A method according to claim 1 wherein each satellite of said GPS transmits the pair of encoded RF signals at predetermined L-band frequencies of 1227.6 MHz and 1575.42 MHz.

13. A method as in claim 1 wherein a plurality of GPS satellites are comprised of twenty-four satellites with the plurality of satellites being arranged in six planes equally spaced about the earth, each plane arranged in spaced angular relation to the other planes and the equatorial plane of the earth; and with the satellites in each plane moving in a common approximately circular orbital path in their respective plane.

14. A method as set forth in claim 13 wherein immediately adjacent planes define an angle of approximately 60° therebetween.

15. A method as set forth in claim 13 wherein each plane and the earth equatorial plane define an angle of approximately 55° therebetween.

16. A method as set forth in claim 13 wherein each satellite of the GPS is disposed at an altitude of approximately 20,000 kilometers above the earth's surface.

17. A method as set forth in claim 13 wherein the satellites in each plane of the series are equally spaced from each other along their orbital path.

18. A method as set forth in claim 13 wherein each satellite orbits about the earth in approximately twelve sidereal hours.

* * * * *